United States Patent
Jurgenson et al.

(10) Patent No.: US 10,333,944 B2
(45) Date of Patent: Jun. 25, 2019

(54) DETECTING IMPOSSIBLE TRAVEL IN THE ON-PREMISE SETTINGS

(71) Applicant: Microsoft Technology Licensing, LLC, Redmond, WA (US)

(72) Inventors: Tom Jurgenson, Tel Aviv (IL); Sivan Krigsman, Hertzliya (IL); Michael Dubinsky, Tel Aviv (IL); Tal Arieh Be'ery, Petch Tikva (IL); Idan Plotnik, Tel Aviv (IL); Gil David, Zichron Yaakov (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 15/342,631

(22) Filed: Nov. 3, 2016

(65) Prior Publication Data

US 2018/0124065 A1    May 3, 2018

(51) Int. Cl.
*H04W 4/02* (2018.01)
*H04L 29/06* (2006.01)
(Continued)

(52) U.S. Cl.
CPC ........ *H04L 63/107* (2013.01); *H04L 63/0281* (2013.01); *H04L 63/1425* (2013.01);
(Continued)

(58) Field of Classification Search
CPC .............. H04L 63/107; H04L 63/0281; H04L 63/1425; H04L 67/18
See application file for complete search history.

(56) References Cited

U.S. PATENT DOCUMENTS

| 8,666,841 B1 | 3/2014 | Claridge et al. |
| 2013/0110715 A1* | 5/2013 | Buchhop ............... G06Q 40/02 705/42 |

(Continued)

OTHER PUBLICATIONS

Kirti, et al., "Threat Modeling and Anomaly Detection", Published on: Dec. 9, 2014 Available at: http://palerra.com/threat-modeling-anomaly-detection-3/.

(Continued)

*Primary Examiner* — Jason K Gee
*Assistant Examiner* — Shu Chun Gao
(74) *Attorney, Agent, or Firm* — Workman Nydegger

(57) ABSTRACT

Determining impossible travel for a specific user entity associated with an on-premises site. A method includes identifying an estimated location of an on-premises site associated with an organization network. Identifying the estimated location of an on-premises site comprises aggregating connection information of remote devices, remote from the on-premises site connecting to the on-premises site. Information related to an on-premises connection event is identified including the estimated location, time information, and a first user identification for an entity. Information is identified related to a different connection event. The information comprises location information, time information and a second user identification for the entity. The information related to the on-premises connection event and the information related to the different connection event are used to detect impossible travel for the entity. An alert indicating an impossible travel condition is provided.

20 Claims, 3 Drawing Sheets

(51) Int. Cl.
*H04L 29/08* (2006.01)
*H04W 12/12* (2009.01)

(52) U.S. Cl.
CPC .......... *H04L 67/18* (2013.01); *H04L 63/0209* (2013.01); *H04W 4/02* (2013.01); *H04W 12/12* (2013.01)

(56) References Cited

U.S. PATENT DOCUMENTS

| | | | |
|---|---|---|---|
| 2014/0230051 A1 | 8/2014 | Vallinayagam et al. | |
| 2014/0244163 A1* | 8/2014 | Zhao | G01C 21/165 701/445 |
| 2014/0281506 A1* | 9/2014 | Redberg | H04L 63/067 713/159 |
| 2014/0324964 A1 | 10/2014 | Anand et al. | |
| 2015/0121506 A1 | 4/2015 | Cavanaugh | |
| 2015/0326595 A1 | 11/2015 | Liu et al. | |
| 2016/0105801 A1 | 4/2016 | Wittenberg et al. | |
| 2017/0264626 A1* | 9/2017 | Xu | H04L 63/1425 |
| 2018/0069896 A1* | 3/2018 | Urmanov | H04L 63/1483 |

OTHER PUBLICATIONS

"Identify, mitigate, and remediate internal and external threats in real-time", Retrieved on: Jun. 9, 2016 Available at: https://www.skyhighnetworks.com/product/box-security/.

"Symantec™ Validation & ID Protection (VIP) Service Description", Published on: Jul. 2012 Availabel at: https://www.symantec.com/content/en/us/about/media/repository/vip-service-description.pdf.

Mackie, Kurt, "Azure Active Directory Identity Protection Preview Released", Published on: Mar. 2, 2016 Available at: https://mcpmag.com/articles/2016/03/02/azure-ad-identity-protection-preview.aspx.

"International Search Report and Written opinion issued in PCT Application PCT/US17/058920", dated Jan. 29, 2018, 12 pages (MS # 360257-WO-PCT).

Chun, et al., "Localization of Wi-Fi Access Point using Smartphones GPS information", In the International Conference on Selected Topics in Mobile and Wireless Networking (ICOST), Oct. 10, 2011, 6 pages.

* cited by examiner

DETECTING IMPOSSIBLE TRAVEL IN THE ON-PREMISE SETTINGS

BACKGROUND

Background and Relevant Art

Computers and computing systems have affected nearly every aspect of modern living. Computers are generally involved in work, recreation, healthcare, transportation, entertainment, household management, etc.

In computing environments, security is an important consideration. In particular, there is usefulness in identifying if a rogue attacker is attempting to access a user's account. One way of making such an identification is to identify that logins are being attempted on a user account that would require impossible travel. For example, if a log-in is attempted from a computer with a USA IP address and five minutes later a log-in is attempted with a computer with a French IP address, this would be detected as an impossible travel scenario, that is, it would be impossible for an actual bona fide user to travel from the USA to France in five minutes.

However, impossible travel detection has not been implemented in some environments where it may be difficult to identify a real world location.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method. The method includes acts for determining impossible travel for a specific user entity associated with an on-premises site. The method includes identifying an estimated location of an on-premises site associated with an organization network. Identifying the estimated location of an on-premises site comprises aggregating connection information of remote devices, remote from the on-premises site connecting to the on-premises site. Information related to an on-premises connection event is identified including the estimated location, time information, and a first user identification for an entity. Information is identified related to a different connection event. The information comprises location information, time information and a second user identification for the entity. The information related to the on-premises connection event and the information related to the different connection event are used to detect impossible travel for the entity. An alert indicating an impossible travel condition is provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
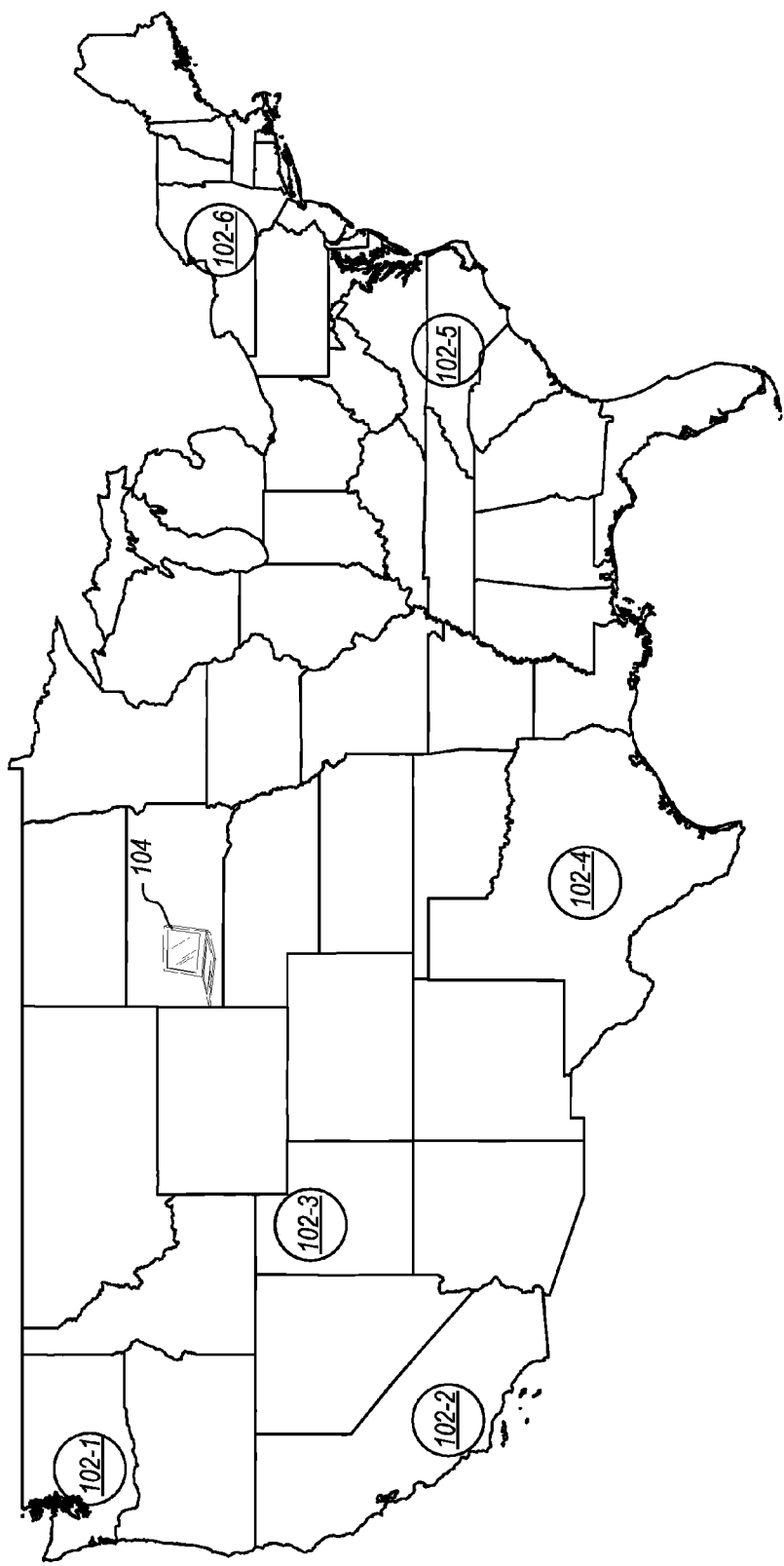
FIG. 1 illustrates on-premises sites distributed geographically.

Impossible travel is an important feature for many security related applications. It detects when an entity (usually an end user) covered a distance in the physical world that is unable to actually be accomplished with current travel technologies. An important application of detecting impossible travel is the detection of compromised credentials usage via physical location anomalies.

Impossible travel to and from on-premises networks in distributed networks has previously not been investigated because it's hard to know where user devices connected in on-premises networks are located in the real world. For example, an enterprise network may have several on-premises networks. The on-premises networks of the same enterprise network share networking resources, such as a corpus of IP addresses each of which can be assigned to any user device connected the enterprise network without regard to which on-premises network the user device is connected. Thus, an IF address allocated for a user device will not be representative of the actual physical geographical location where the user is physically geographically located. Thus, impossible travel detection has not been able to be accomplished when one of the locations is an on-premises site of a bigger network.

Some embodiments of the invention are able to detect impossible travel in the context of organizational on-premises networks. In particular, embodiments may be able to use user login information and other information to attempt to estimate the location of an on-premises network and to detect that a user is connected to the on-premises network. Embodiments can detect additional login information for the user that would indicate that the user is logging in from a location remote from the on-premises network. If the remote location does not meet possible travel scenarios, it can be determined that a potential security breach has occurred with respect to the user.

Some embodiments may be configured to densify the location signal for entities (e.g., end-users, servers, network hardware, etc.) with a large quantity of high quality data. This can be used to estimate the location of an on-premises network to evaluate user travel to and from the on-premises network.

Embodiments may be configured to extend the classic impossible travel scenario of known real-world location to known real world location by including support for additional scenarios that are important in the organizational settings (e.g., enterprises, schools, government bodies, etc.), such as impossible travel between known real world location to on-premises network site and impossible travel between on-premises network site to on-premises network site. For example, a "real location" might be one that is identifiable by GPS coordinates, cell tower triangulation, Wi-Fi based location technologies, and the like. In contrast, an "on-premises site" is an organization site where real world location is obfuscated by virtue of the on-premises site being part of a larger organization network not having just a single particular geographic location associated with it and potentially having multiple geographical locations associated with the larger organization.

Embodiments may accomplish this functionality by performing various subtasks. In particular, embodiments can process one or more external real world geographical signals that contain for each entry a timestamp, a user, and some real world location indicator. Each entry may be stored in a data store. For example, the real world location indicator may include an IP address that can be translated to a location using 3rd party geolocation services. Alternatively or additionally, in some embodiments, the external signals are signals related to, or caused by virtual private network (VPN) connections made by users in the organization.

Embodiments also estimate the location of on-premises sites. This can be done in a number of different ways, as will be illustrated in more detail below.

Referring now to FIG. 1, an example, is illustrated. FIG. 1 illustrates a geographically distributed organization network 100 (see FIG. 2), with different on-premises sites 102-1 through 102-6 distributed in different physical geographic locations. Note that while six sites are illustrated in the network 100 here, it should be appreciated that virtually any number of different sites could be implemented.

The network 100 is in communication with a geolocation service 114 to provide locational data for the remote devices, such as device 104-2. Again, although six sites 102, one remote device 104-2, and one local device 104-1 are illustrated, the number of sites 102, remote devices, such as device 104-2, and local devices, such as device 104-1, may be greater than or less than what is illustrated in the example network 100.

Figure 2:
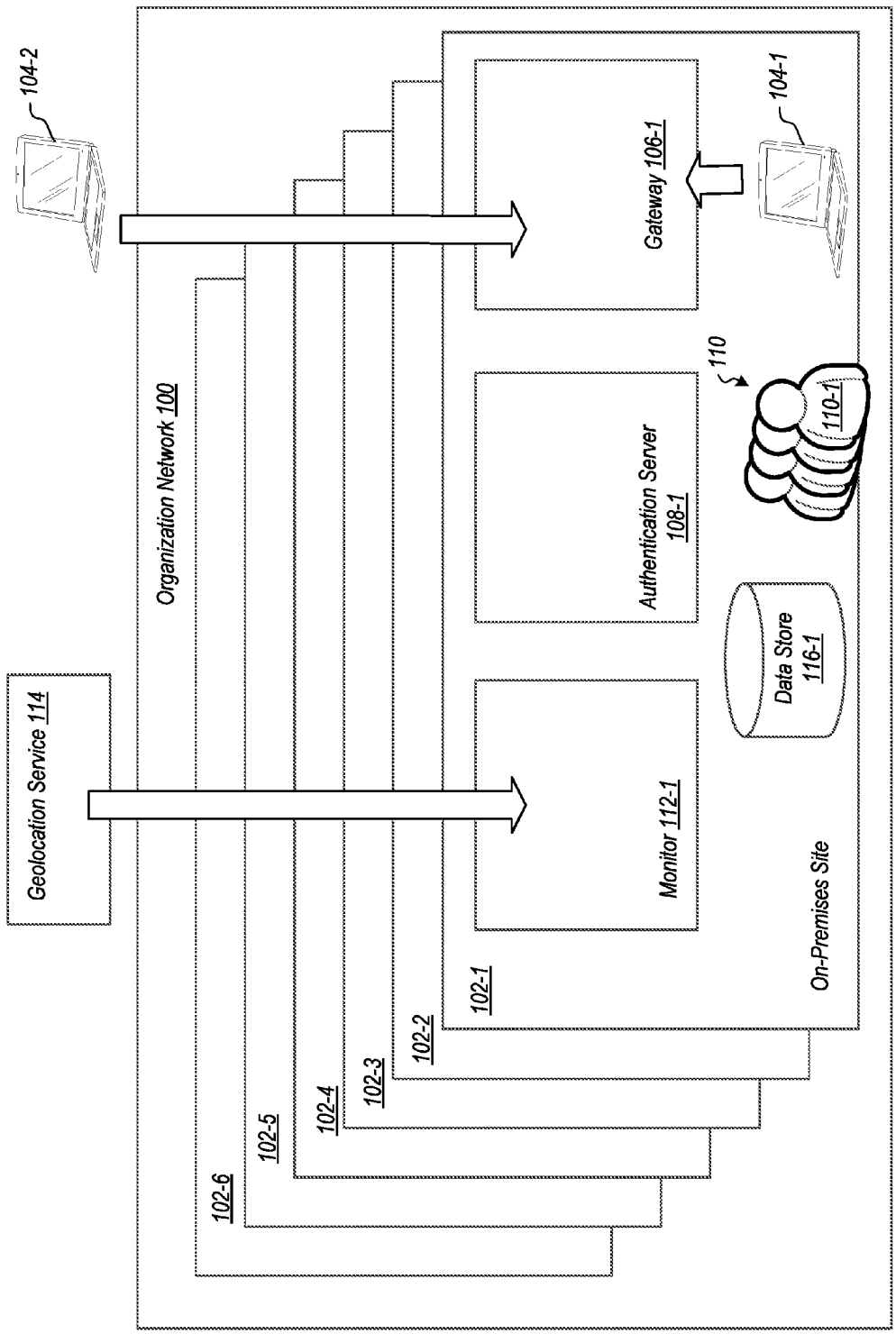
FIG. 2 illustrates a block diagram of an organization network.

As illustrated in FIG. 2, a site 102-1 of the network 100 includes: a gateway 106-1, operable to accept communications from devices connecting to the site 102-1; an authentication server 108-1, which is in communication with the gateway 106-1 and operable to authenticate entities seeking to access the network 100; and a monitor 112-1, in communication with the authentication server 108, and operable to aggregate connection information from the remote devices, such as device 104-2, to manage entity location data. While site 102-1 is shown as having each of these components, other sites in the sites 102 may have a different set of components as some of the components can be shared between sites.

Gateways 106 and authentication servers 108 will be understood by one of skill in the art to include hardware devices and software running on those devices to provide the functionalities thereof. In various embodiments, the monitor 112-1 may be run on dedicated hardware or may be provided via software on a computing device used for several purposes, such as, for example, on the same hardware as the authentication server 108-1. In other embodiments, the network 100 may make use of fewer monitors 112 than sites 102; some or all of the sites 102 may share a monitor 112.

Remote devices, such as device 104-2, and local device 104-1 are operated by users, who may be humans or automated systems (e.g., "bots") that request connections to one or more sites 102 of the enterprise network The different sites (referred to herein generally as 102) can be utilized in a number of different ways and may be distributed geographically in a number of different ways. For example, each of the different sites 102 may represent a different branch office for the organization. In particular, a site 102 may be implemented in a location where employees or other users in the organization can physically go and work. In particular, a site 102 may include network hardware that allows users to go to the location of the site 102 and connect a user device, such as the user device 104-1 illustrated in FIG. 2, directly to the network hardware, such as in scenarios where the users connect to a local area network (LAN) to allow the users to access organization resources and connect with other users at the organization. In this example, the user device 104-1 is physically located in the same physical geographic location as the site 102-1.

The user device 104-1 maybe any one of a number of different devices including devices such as laptop computers, desktop computers, cellular telephones, personal digital assistants, or other user devices.

Notably, the various sites 102 may be interconnected. This may be accomplished in a number of different fashions. For example, in some embodiments, a central system, which may or may not be located at one of the sites 102, may act as a coordinator between the various sites 102. Alternatively or additionally, one of the sites 102 may act as a coordinator site for the other sites in the network 100. In yet another alternative or additional embodiment, the various sites 102 may interconnect with each other in a peer to peer fashion. Interconnection of the various sites 102 allows the various individual users belonging to the organization to be able to access organization resources and communicate with each other through various network connections such that a user at any one of the sites 102 can communicate with the user at any of the sites 102 including the same site or other sites.

Additionally or alternatively, the sites may include provisions for allowing users to connect to the site from a user device 104 that is physically external to a given site 102. For example, as illustrated in FIG. 2, the user device 104-2 may physically exist outside of the network 100. In this example, the user device 104-2 can connect to a gateway (illustrated generally as 106, but shown in a specific example has gateway 106-1). Note, a user device that is outside of the network 100 will often try to connect to a site 102 that is the most proximate geographically to the user device 104. However, it should be appreciated, the user device 104 may connect to a different on-premises site when the user device 104 is outside of the network 100 for purposes of load balancing, or for other reasons.

The network 100 is able to learn the location of remote devices connected to the network by monitoring and logging the VPN (or other network tunnel) traffic used to connect the devices to the network 100. As users connect to a given site 102 in the network 100, the site will use the Internet Protocol (IP) or other addresses or information such as GPS signals, Wi-Fi geolocation information, or other information associated with the devices to perform geolocation for the connected devices. For each site the geolocation information for selected devices connected to that site 102 are aggregated over a period of time to estimate an estimated location for the sites physical geographical location. User accounts that access the site via local devices (e.g., the device 104-1 with respect to site 102-1) (e.g., not via a VPN or network tunnel) and use an internal IP address from the site 102 can be assigned a location equal to the site's location (estimated location or known physical location), but in some embodiments, may be excluded from the aggregation of geolocation information to estimate a site's location to avoid a self-confirmation bias. Thus, by using the network address information of devices (e.g., device 104-2 as shown in FIG. 2) that remotely log into the network 100 (e.g., Internet Protocol (IP) addresses), the physical locations of those devices may be determined through geolocation without requiring those devices to self-locate. The aggregated geo-locations for the remote devices connecting to a site 102 (e.g., site 102-1) of the system are then used to infer a location of that site, which may then be assigned to devices (e.g., device 104-1) that are locally connected to that site 102, which may otherwise be un-locatable via geolocation.

Embodiments can implement a learning pipeline for locating virtual entities (such as an authentication server 108 (e.g., authentication server 108-1), such as a domain controller available from Microsoft Corporation, of Redmond, Wash.) in an internal network 100. The resulting mapping allows internal network actions and entities to be mapped into actual or approximate real world physical geographical locations. For example, embodiments may be able to locate an actual or approximate on-premises site location based on on-premises passive traffic monitoring. This enables the ability to approximate where users and their devices (e.g., device 104-1) are located in the world, even if they are currently only using resources of an internal network 100.

To estimate the location of an entity (such as an authentication server 108 or some other piece of network hardware), embodiments look for users that are affiliated to this entity. For example, a set of users may connect to a site 102 where the entity (e.g., the authentication server 108-1) resides as their home or primary site. That is, the users connect their devices (e.g., device 104-1) locally at the site (e.g., site 102-1) in some significantly affiliated way. For example, the users may authenticate at the site locally using LAN connections more often that they authenticate to other sites locally using LAN connections in the network 100. Alternatively or additionally, the users may be assigned the site 102-1 as their primary work locations. Embodiments then look for indicators of those affiliated users 110 using their devices in the real world. For example, in some embodiments, this can be done using information from a VPN feed to the network 100. Embodiments combine these indicators for these affiliated users 110, using statistical analysis, to derive the location of the entity (e.g., the location of the authentication server 108-1).

Illustrating now additional details, embodiments first define an entity, e.g., authentication server 108-1, in a local network, such as an on-premises site 102-1, to be located. This entity will have a strong location correlation with the users it serves. For example, embodiments may attempt to estimate the location of sites, and their authentication servers.

Embodiments can then define what is considered one or more affiliated users 110 for that entity and find those affiliated users 110. For instance, some embodiments can identify affiliated users 110 that appear at least X times in authentication requests in the subnets of the site 102-1. Alternatively or additionally, some embodiments can implement temporal queries such that any user that authenticates at the site 102-1 at least X times in the last Y timeframe is defined as an affiliated user.

Given the identification of affiliated users 110 from above, embodiments can look to identify their indicators in a data feed that contains some real-world location indicators. Users that have such indicators are considered the active users for the entity (e.g., authentication server 108-1). For example, embodiments may examine VPN connections made by users and translate the external IP addresses of devices for those users to geographical locations. Note that typically, when a device 104-2 connects to the network 100 through a VPN, the device will be associated with an external IP address provided by an internet service provider network external to the network 100 as well as being associated with an internal IP address associated with the network 100. The external IP address can be used in sonic embodiments, to estimate the location of the device 104-2. Alternatively or additionally, the device 104-2 may be associated with a Wi-Fi hotspot or router, with a known location. This information can be used to provide location information for the device 104-2. The indicators from the active affiliated users 110 for the entity are combined to a single prediction for the location of the site.

The devices, referred to generally as 104, access the network 100 by being authenticated by an authentication server, such as authentication server 108-1 of one of the sites, such as site 102-1. Remote devices, such as device 104-2, may connect to a given site, such as site 102-1, via a Virtual Private Network (VPN) connection or other tunnel to initiate a session, whereas local devices, such as device 104-1, connect to the site 102-1 at which they are located, such as through a LAN or other local connection. Whether a given device is a remote device or a local device depends on how it connects to the network 100, and a given device may be, at different times (or in some cases at the same time) a remote device and a local device. For example, a user may use a device as a local device while in an office location located at the site 102-1 to connect locally to the network 100 using a LAN. The user may use the same device at home or on travel and log into the network 100 via a VPN, making that device a remote device for the remote session.

For example, user 110-1, may specify a particular site, such as site 102-1, to log into, or the site 102-1 that is connected to may be automatically selected by a login agent running on the user's device based on, assignment of a site 102-1 to a user or user's device, a determination of the site 102-1 that is physically closest to the user, the site 102-1 that responds fastest to the user's communications (e.g., to avoid network congestion, to connect to a site 102-1 that has a better ping despite being located further away), to a site that is logically closer to a user (e.g., has less intervening network components between the user's device and the site 102-1), etc.

Entities (devices or user accounts) that are affiliated with a given site 102-1 may be noted and mapped by either the authentication server 108-1 or a monitor 112-1 (or other appropriate component) as using the given site 102-1 as their "home" site 102-1, whereas entities that are not affiliated (e.g., do not connect sufficiently often, are not assigned to the site, etc.) connect to the given site 102-1 away be noted as connecting to a "guest" site 102-1. In some embodiments, entities are mapped to the one site 102 on which they are most active (locally, remotely, or locally and remotely), while in other embodiments a given entity may have "home" status on more than one site 102 or on no sites 102 based on some factor, such as a minimum number of connections to a given site 102. For example, a user based out of Office A and whose account is associated with a first site 102-1 as a "home," may be transferred to Office B and begin using a second site 102-2 associated with Office B more frequently. The example user's account may be remapped to the second site 102-2 as a "home" over the course of several days/weeks/months as the user connects to Office B's site 102-2 more frequently than Office A's site 102-1. Contrarily, if the example user used (and left) a first device at Office A and the user were assigned a new device at Office B, the first device may remain associated with the first site 102-1 as its "home." In another example, a salesperson who frequently travels and logs on remotely to a first site 102-1 and a second site 102-2 may have each site 102-1 consider itself the "home" of the user's account due to the frequency at which the salesperson connects to each site 102 and the salesperson exceeding a minimum number of connections to each site 102 during a time period. When the monitor 112-1 determines the estimated location of the site 102-1, it may exclude the location information from "guest" entities, provide greater weight to the location information from "home" entities as compared to "guest" entities, or treat the location information equivalently, regardless of home/guest status. The monitor 112-1 may also periodically reevaluate whether a given entity has home or guest status on a given site 102-1.

The monitor 112-1 will observe the network address information from remote devices, such as device 104-2, connecting to the associated site 102-1 and will decide whether to store those addresses for use when inferring an estimated location of the site 102-1. Each time a user account successfully logs into the site 102-1 and establishes a session on the network 100, the monitor 112-1 may store the address information associated with the login request, or the monitor 112-1 may filter or restrict the number of logins from a given user account for a given time period for which to store the address information. For example, a user of a remote device 130 with an intermittent Wi-Fi signal may repeatedly gain and lose connection to the site 102-1, and may be forced to constantly re-authenticate with the authentication server 1084, which the monitor 112-1 may choose to treat as multiple successful login attempts or as a single login attempt if the attempts fall within a predetermined time range of one another. Alternatively, the monitor 112-1 may collect all of the address information and later filter it when determining the estimated location of a given site 102-1.

Local devices, such as device 104-1, may also have their connection attempts to the authentication server 108-1 and activity session logged by the monitor 112-1 for security purposes. As will be appreciated, local devices, such as device 104-1, are associated with IP addresses internal to the network 100, which may be masked for use within the network 100, and therefore may produce spurious results if provided to the geolocation service 114. The monitor 112-1 will note the entities associated with the login and session (e.g., the user account and devices), and will assign the location (estimated or physical) of the site 102-1 to the entity at the time of login. For example, a user account for a user entity or Media Access Control (MAC) address, serial number, etc., for a device entity may be tracked to determine whether a second login using the same entity identifiers occurring at a second time violates one or more security rules for the user account.

In various embodiments, the monitor 112-1 may store and use, store and filter, or exclude from storage connection attempts that were rejected by the authentication server 108-1 (e.g., an incorrect username or password were provided). Similarly, the monitor 112-1 may store and filter (or block from storage) connection attempts received from a list of addresses that are associated with blocked parties, unreliable geolocation, or whose duration or number of connections meet an unreliability threshold (e.g., multiple short connections may indicate an unstable connection, and may be filtered out or ignored). For example, a user making use of a VPN connection from a smartphone may have a signal routed through a cell-provider's network to reach the site 102-1, and the address of the cell-provider's network is provided to the monitor 112-1 instead of the remote device's address internal to the cell-provider's network, making the address unreliable for geolocation, which may be flagged for the monitor 112-1 or noted over time by the monitor 112-1 as being unreliable based on the Internet Service Provider (ISP) frequently providing IP addresses unreliable for geolocation. Additionally or alternatively, the monitor 112-1 may filter out data from connection attempts that are beyond a preset distance from a site 102-1 or that specify a specific site 102-1, as their inclusion may affect the calculation of the location of the site 102-1.

When the monitor 112-1 uses the external IP address to determine the estimated location of the site 102-1, the stored external IP addresses that are to be used are transmitted to the geolocation service 114, which returns a geographic location associated with the external IP address. Examples of geolocation services 114 include, but are not limited to MaxMind of Waltham, Mass. and NeuStar of Sterling, Va., which provide geographic coordinates correlated to IP (or MAC) addresses back to the monitor 112-1. The geographic coordinates may be provided in terms of latitude/longitude coordinates, cities, regions, and countries. Geographic coordinates may be requested in real-time (as entities connect) or held in batches for periodic (e.g., daily, weekly, monthly) or on-demand processing by the geolocation service 114.

Each located remote login is associated with the geolocation provided by the geolocation service 114 and the time at which it was made to the network 100. Using these data, the monitor 112-1 is operable to infer a centralized location to the remote connections to use as an estimated site location. As more located remote logins are used, the inference of the estimated site location can be made more accurately, and the monitor 112-1 may apply additional filtering to which geographic data and login data are used in the calculations.

As will be appreciated, various algorithms and methods may be used to determine the centralized location for use as the estimated site location. In some embodiments, arithmetic mean values are estimated for the latitude and longitude from the latitudes and longitudes of the geolocation values of the located remote logins. In other embodiments, when the geolocation values are not provided as latitude/longitude coordinates, but as the name of a city, region, or country, the monitor 112-1 may use the mode of the geolocation values from the located remote logins or may convert the non-coordinate geolocation values into a latitude/longitude pair of coordinate for a central location of the city, region, or country.

In some embodiments, different weights may be applied to the geolocation values based on the frequency of use of a given identifier, a physical or temporal proximity of one login attempt to another login attempt, a physical proximity to the centralized location (which may be estimated recursively), a given time range at which the located remote login was made (e.g., during business hours, on a weekday), and whether the identifiers are unique during the period being estimated. The monitor 112-1 may also account for geographic and geopolitical data when calculating the centralized location, such as, for example, to avoid placing the estimated centralized location in a body of water, across a national/provincial border, on a road, in a use-restricted space (e.g., a park, a facility known to be used by another entity, an area zoned for residential use when a commercially zoned area is required), an area with high crime/taxes/rents, etc., or to specifically place the centralized location in a given nation/province/city/neighborhood.

In embodiments where the coordinates of the physical geographical site location are known to the monitor 112-1, the monitor 112-1 may apply machine learning techniques to vary the weights or hyperparameters of the learning algorithm to match the estimated site location to the physical geographical site location and apply the adjusted weights and hyperparameters in subsequent calculations for sites 102 that do not have a known physical geographical site location.

User and device entities can be divided into subgroups to produce an estimated site location for each subgroup. Additionally, the subgroups may be created based off of an individual entity's use patterns to determine the point about which the entity's remote logins are centered. Subgroups may be set according to criteria specified by the network administrators (e.g., entities connecting at least X times per month, entities at least X km away from a given point, entities within X km of a given point, a specified entity or entities) or may be identified automatically by the monitor 112-1 according to a clustering or distribution algorithm (e.g., k-means, DBSCAN).

To determine impossible travel scenarios, embodiments may also establish user presence over time. For example, embodiments may generate or reference a specific user timeline that contains logins and logoffs to, and from machines the user uses. In some embodiments, those login and logoff events can be based on network traffic. Some embodiments may identify when the login is made from a remote connection, when the user is actually near the machine itself (rather than the authentication being part of some automatic process). For example, some embodiments may require biometric authentication processes that examine human features to effectively log in to a machine. Alternatively or additionally, embodiments may require the presence or use of a user token, such as a smart card or a near field communication (NFC) device typically possessed by users to effectively log in to a machine.

In the context of environments with directory services, such as Active Directory available from Microsoft Corporation, of Redmond, Wash., the location (site-wise) of each event is also watched. Note that if the user is using a tunneling service (such as but not exclusive to VPN and Direct Access) this will be used as a different special site. Embodiments may try to infer from the signals collected as described above, where the user was and for how long, Thus for example, for a given a user JhonD and sites: S1 and S2 embodiments may produce a data store 166-1 entries similar to the following:

JhonD was seen at S1 using machine JhonDLaptop from 1 of Jan. 2015 8:00 AM until 1 of Jan. 2015 1:00 PM, JhonD was seen at S2 using machine JhonDLaptop from 3 of Jan. 2015 9:00 PM until 4 of Jan. 2015 1:00 AM.

JhonD was seen at S2 using machine JhonDLaptop from 13 of Jan. 2015 7:00 AM until 13 of Jan. 2015 7:00 PM.

Referring once again to FIG. 2, where the example of a network 100 is illustrated, the gateway 106-1 operates to accept communications from the devices 104 accessing the network 100. The authentication server 108-1 communicates with the gateway 106-1 to authenticate the devices 104 seeking to access the network 100. The monitor 112-1, communicating with the authentication server 108-1, operates to aggregate connection information from the devices 104 accessing the network 100. The monitor 112-1 passively collects traffic to the network 100 from the devices 104. For example, in one or more embodiments, all or part of the collected traffic may be tunneled traffic from remote device 104-2 connected via VPN or other tunnel where users are allowed access to network services. Software agents on the devices 104 are not required to collect traffic and ascertain the login and logoff information.

The monitor 112-1 is further operable to determine, over a period of time, the login and logoff information of a user of a device 104 from the collected network traffic. The period of time, for example, may be more than one session, over the course of a single day, or over multiple days. The monitor 112-1 also determines network sessions, which may occur over a single day or multiple days, from the login and logoff information of the user of a device 104 and generates a timeline or timetable specific to the user that contains the network session logins. The timetable is generated based on when the packets associated with the login and logoff information are received and analyzed rather than what the information is that the packets contain. By analyzing the traffic of network packets the user identity can be determined along with which host the user was logging into. Upon determining how long the user was active in that host, a session or event may be assigned from which that particular user's presence may be determined.

Thus, the timetable identifies sessions when the user was active and when the user was otherwise not active based on the login and logoff information. The monitor 112-1 utilizes the timetable to determine whether the user of the device 104 was present at a particular location at a particular time. The timetable may also be used to identify sessions when the user is present at other particular locations at other particular times based on login and logoff information. Also, the timetable may be used to identify when the user is not actively on the network 100.

In one or more embodiments, a device 104 may be tracked to determine whether a second login using the same entity identifiers occurring at a second time violates security rules.

Entities such as the remote device 104-2 and local devices, such as device 104-1, access the network 100 by being authenticated by the authentication server 108-1. Thus, the monitor 112-1 in communication with the authentication server 108-1 can identify when the user is actively on the network 100 upon authenticating each login pursuant to utilization of an authentication protocol. Thus, the monitor 112-1 can also identify when the user is not actively on the network 100 via the authentication process. Utilization of an authentication protocol can include protocols such as NT LAN Manager (NTLAM), Kerberos, Lightweight Directory Access Protocol (LDAP) and Network Time Protocol (NTP) or any other suitable authentication protocol. Thus, successful authentication of the logins generates and updates the timetable. Authentication packets via the authentication protocols can be correlated to determine whether the collected traffic came from a particular device.

The type of connection or the type of login is also useful in determine a user's presence and for generating the timetable. Identifying the types of logins within the login information can be used to determine whether the user is actively on the network. For example, an interactive login requires the user to enter credentials which evidences the user is actually logging into the device. On the other hand, logins other than interactive logins could lead to determining that the user is not actively on the network 100. For example, automatic or triggered logins or logins occurring as a result of a service should be distinguished in the timetable or not be included in the timetable. Determining if a login is a remote or local login can also be used to generate the timetable.

The following illustrates a detailed example. In this example, one embodiment estimates that an organizational site is located at a site in New York City. The embodiment also identifies that the user jhonD logged in with his machine in New York City at 10:00. The embodiment also identifies that a VPN connection was attempted by jhonD at 11:00 from China. Embodiments determine these three facts have high confidence. This causes an alert for impossible travel to be produced.

In an alternative example, an embodiment estimates that an organizational site is located at a site in New York City. The embodiment also identifies that the user jhonD logged in with his machine in New York City at 10:00. The embodiment also identifies that a connection was attempted by jhonD at 11:00 from an organization site in China. Embodiments determine these three facts have high confidence. This causes an alert for impossible travel to be produced.

In yet another alternative example, one embodiment estimates that the user jhonD logged in with his machine using a VPN connection in New York City at 10:00. The embodiment also identifies that a VPN connection was attempted by jhonD at 11:00 from China. Embodiments determine these three facts have high confidence. This causes an alert for impossible travel to be produced.

Thus, embodiments are able to detect impossible travel within the on-premises context. In particular, embodiments can detect impossible travel from an on-premises site to a remote location, from an on-premises site to another on-premises site, and/or from a remote location to an on-premises site. Further, as illustrated above embodiments can enrich location feeds with dense and high quality data. Also as illustrated above, using machine learning techniques, embodiments can improve the quality of detection of impossible travel between two external feeds.

As illustrated above, embodiments receive as input, a feed of signals (such as logins and logoffs). The embodiments preprocess the feed to filter out low quality data and store the data as entries in a data store 116-1. In some embodiments, each entry created from the feed of signals in the data store 116-1 has a username, location indicator, start of session time, and end of session time. For example, for the feed that describes the on-premises activity, embodiments have the ability to know when a user logs in to a machine, and if the user does so remotely or not. The location indicator when the user logs in at an on-premises site (such as when a user uses a local device, such as device 104-1) is a known or estimated physical geographical location of the on-premises site (e.g., site 102-1) where the machine (e.g., device 104-1) logged into physically.

When a device 104-2 is used to log in remotely to a site, e.g., using a VPN connection, the device will have a location indicator which may be an external IP address. This external IP address can be mapped to a location by using a geolocation service 114 such as MaxMind of Waltham, Mass. and NeuStar of Sterling, Va.

Different feeds of information can be combined into a single feed (some of which may intersect). In some embodiments, a single entry created by this single feed can include two adjacent single feed time and location indicators and can be used to identify the time difference and geographical distance between the two locations. In some embodiments, a single entry could include two delta fields for an entity, one for time and one for distance. In alternative embodiments, the time delta and distance delta could be computed from two different, but adjacent (i.e., one entry immediately subsequent, without intervening entries, to another entry) entries.

An alert candidate is an entry (or pair of entries) that identifies or can be used to identify travel that is faster than a specific threshold. For example, some embodiments may have a threshold where a speed computed from the time delta and the travel delta of two different logon and/or logoff events would need to exceed 1100 km per hour, such as the speed of commercial flights. When an alert candidate is identified, an impossible travel alert can be issued.

This alert can be used to block a user's access to network 100 resources until issues can be resolved to ensure that the user is able to access the network 100 securely and/or that other nefarious users are not able to access the network 100 using the legitimate user's account information. Alternatively or additionally, embodiments may not completely block network 100 access to all resources, but rather may block access to certain resources while allowing access to others. This could be used in a "honey-pot" scenario to attempt to identify nefarious users accessing the network. In yet another alternative embodiment, when an alert is issued, any users for which the alert is issued can be allowed to access dummy network resources having invalid and/or unimportant data and resources. Again, the users can be encouraged to continue using the network 100, although in a non-harmful way, until the users can be identified with particularity.

However, it should be appreciated that in many scenarios, there are common abnormalities that occur in the data. For example, Some embodiments may filter out such abnormalities. For example, such abnormalities may be specified by administrator defined rules. Alternatively or additionally, embodiments may implement machine learning functionality that is able to learn those abnormalities by using domain specific rules to identify known patterns that, although ordinarily might trigger an impossible travel alert, do not trigger such an alert as they are known to be (or are at least in all probability) false positives. Any abnormalities can be filtered out. Alert candidates that survive this filtering cause an alert to be issued. Generally, an alert candidate will survive filtering because they do not match any known pattern.

The following discussion now refers to a number of methods and method acts that be performed. Although the method acts may be discussed in a certain order or illustrated in a flow chart as occurring in a particular order, no particular ordering is required unless specifically stated, or required because an act is dependent on another act being completed prior to the act being performed.

Figure 3:
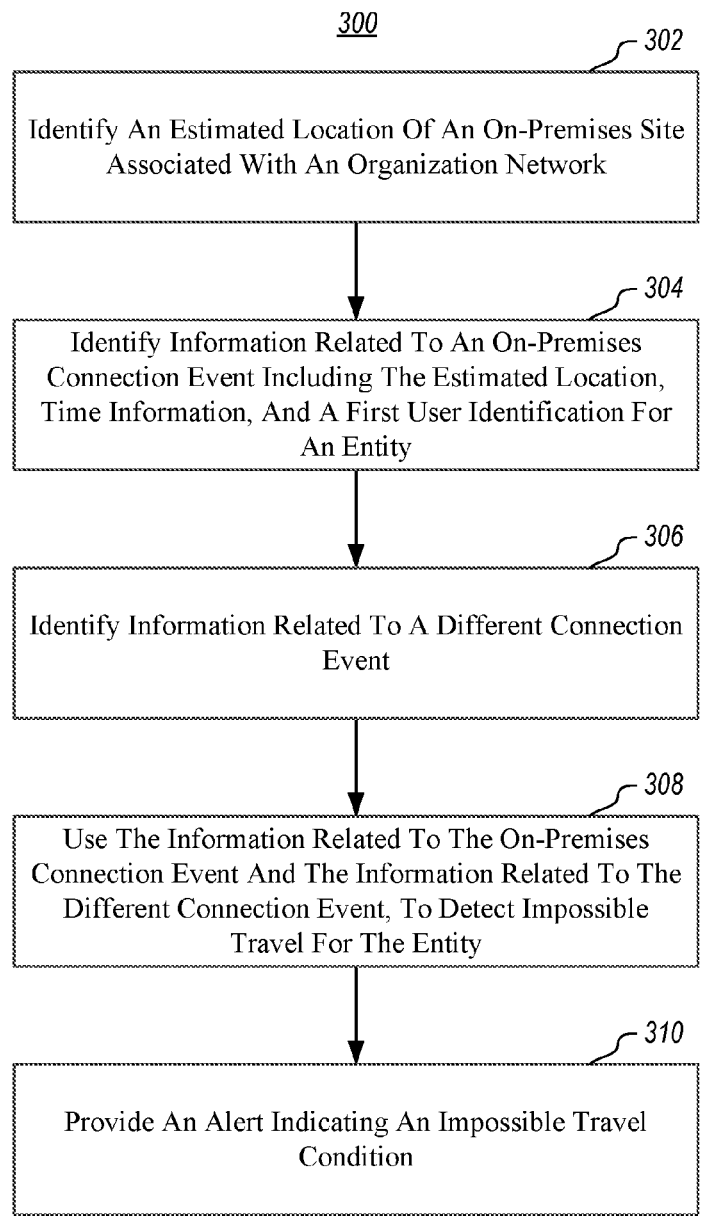
FIG. 3 illustrates a method of determining impossible travel for a user of an on-premises network.

Referring now to FIG. 3, a computer implemented method 300 is illustrated. The method 300 may be practiced in a computing environment and includes acts for determining impossible travel for a specific user entity associated with an on-premises site. The method 300 includes identifying an estimated location of an on-premises site associated with an organization network (act 302). Identifying the estimated location of an on-premises site may include aggregating connection information of remote devices, remote from the on-premises site connecting to the on-premises site.

The method 300 further includes identifying information related to an on-premises connection event including the estimated location, time information, and a first user identification for an entity (act 304). For example, a user may login to or log off of the network 100 using the device 104-1 at a site 102-1, where the location of the site 102-1 can be estimated based on previous logins and logoffs to and from the site 102-1. Typically, the logins and logoffs used to estimate the location of the site 102-1 are logins and logoffs from users at remote devices, such as device 104-2, as illustrated above.

The method 300 further includes identifying information related to a different connection event (act 306). The information comprises location information, time information and a second user identification for the entity. Note that the first user identification and the second user identification may be the same identification, but do not necessarily need to be the same user identification. For example, in some embodiments, the user identification, in both cases, may be the username for the network 100. However, in other embodiments, the user identifications may be different identifications, but that both identify the same user. For example, the first user identification may be a user name for an entity for use on the network 100, where the second user identification may be a gaming login identifier, web mail login identifier, social media login identifier, or other appropriate identifier that also identifies the entity. Thus, all logins and logoffs do not even necessarily need to be associated with the network 100, but rather logins and logoffs on other networks and other services may be used so long as appropriate information from those logins and logoffs can be collected. Such information includes user identifiers, time, and location.

The method 300 further includes using the information related to the on-premises connection event and the information related to the different connection event, detecting impossible travel for the entity (act 308). For example embodiments may determine that it would be impossible for a user to travel to or from the on-premises site 102-1 from or to another location, such as a remote location, or other on-premises site.

The method 300 further includes providing an alert indicating an impossible travel condition (act 310). For example, an alert may be provided to the authentication server 108-1, which can create a more secure network 100 by limiting access by the entity to the network 100.

The method 300 may be practiced where the different connection event comprises a connection event from a different on-premises site associated with an organization network. In particular, impossible travel may be detected from on-premises site to on-premises site. Both of the on-premises sites can have their location estimated by evaluating previous interactions of entities with the sites.

The method 300 may be practiced where the different connection event comprises a login from a remote location to a given on-premises site, but remote from the given on-premises site. In some such embodiments, the connection event from the remote location comprises a VPN connection. Alternatively, the connection event from the remote location comprises an authentication (e.g., a login or logoff) event using at least one of tunneling protocols, cloud services authentication or consumer connections (e.g., consumer web mail or social media authentication), etc.

The method 300 may further include preprocessing the information related to the on-premises connection event o create a standardized information set. The method 300 may also further include preprocessing the information related to the different connection event to create a different standardized information set. The preprocessing may include taking as input, machine learning predictions, geo-location information, public API inputs, etc. This can be used to infer location and format the location information in a standardized format. Additionally, preprocessing may be able to identify if IP addresses are mobile gateways or not. A mobile gateway is a gateway, where the IP address cannot be reliably resolved to a location. If mobile gateways are being used, there is typically no need for preprocessing as it will not yield reliable location information. Thus, in some embodiments, detection of a gateway that is not a mobile gateway may result in triggering pre-processing activities to standardize location information. The method 300 may also further include combining the standardized information sets to create a composite information set. Using the information related to the on-premises connection event and information related to the different connection event may include using the composite information set to identify impossible travel.

The method 300 may further include performing post-processing on any detected impossible travel to reduce noise for false positive alerts. For example, embodiments may use pattern recognition tools, such as machine learning, to identify common patterns and mark them as benign and not indicative of an impossible travel event.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to determine impossible travel for users connecting to on-premises sites of a multi-site distributed network, including instructions that are executable to configure the computer system to perform at least the following:
   identify an estimated location of a given on-premises site associated with the multi-site distributed network, wherein the multi-site distributed network comprises a plurality of on-premises networks that share networking resources including a corpus of IP addresses each of which can be assigned to a user device connected to the distributed network without regard to which on-premises network the user device is connected, and wherein identifying the estimated location of the given on-premises site comprises inferring the geolocation of the given on-premises site by aggregating geolocation based on network address information of remote devices that are each logging into the given on-premises site using an external IP address, and wherein local devices that use an internal IP address from the given on-premises site but which are otherwise not locatable via geolocation are then assigned a geolocation equal to the given on-premises site's estimated geolocation;
   identify information related to a first on-premises connection event at the given on-premises site, wherein the identified information comprises the estimated location, time information, and a first user identification for an entity;
   identify information related to a second different on-premises connection event, where the information related to the second different on-premises connection event comprises location information, time information and a second user identification for the entity;
   compare the information related to the first on-premises connection event and the information related to the second different on-premises connection event, wherein the information related to at least one of the first and second on-premises connection events is based on the inferred location of the given on-premises site, and based on the comparison detecting impossible travel for the entity irrespective of whether the impossible travel is based on i) travel from the given on-premises site to a remote location outside of the multi-site distributed network, ii) travel from the given on-premises site to another on-premises site of the multi-site distribution network, or iii) travel from a remote location outside of the multi-site distributed network to the given on-premises site; and
   provide an alert indicating an impossible travel condition.

2. The computer system of claim 1, wherein the different connection event comprises a connection event from a different on-premises site associated with the multi-site distributed network.

3. The computer system of claim 1, wherein the different connection event comprises a connection event from a remote location outside of the multi-site distributed network to the given on-premises site.

4. The computer system of claim 3, wherein the connection event from the remote location comprises a VPN connection.

5. The computer system of claim 3, wherein the connection event from the remote location comprises a connection event using at least one of tunneling protocols, cloud services, or consumer connections.

6. The computer system of claim 1, wherein one or more computer-readable media further have stored thereon instructions that are executable by the one or more processors to configure the computer system to further perform the following:
> pre-processing the information related to the given on-premises connection event to create a standardized information set;
> pre-processing the information related to the different connection event to create a different standardized information set; and
> combining the standardized information sets to create a composite information set, and wherein using the information related to the given on-premises connection event and information related to the different connection event comprises using the composite information set to identify impossible travel.

7. The computer system of claim 1, wherein one or more computer-readable media further have stored thereon instructions that are executable by the one or more processors to configure the computer system to perform post-processing on any detected impossible travel to reduce noise for false positive alerts.

8. The computer system of claim 7, wherein the post processing comprises pattern recognition for removing common patterns.

9. A computer implemented method of determining impossible travel for users connecting to on-premises sites of a multi-site distributed network, the method comprising:
> identifying an estimated location of a given on-premises site associated with the multi-site distributed network, wherein the multi-site distributed network comprises a plurality of on-premises networks that share networking resources including a corpus of IP addresses each of which can be assigned to a user device connected to the distributed network without regard to which on-premises network the user device is connected, and wherein identifying the estimated location of the given on-premises site comprises inferring the geolocation of the given on-premises site by aggregating geolocation based on network address information of remote devices that are each logging into the given on-premises site using an external IP address, and wherein local devices that use an internal IP address from the given on-premises site but which are otherwise not locatable via geolocation are then assigned a geolocation equal to the given on-premises site's estimated geolocation;
> identifying information related to a first on-premises connection event at the given on-premises site, wherein the identified information comprises the estimated location, time information, and a first user identification for an entity;
> identifying information related to a second different on-premises connection event, where the information related to the second different on-premises connection event comprises location information, time information and a second user identification for the entity;
> comparing the information related to the first on-premises connection event and the information related to the second different on-premises connection event, wherein the information related to at least one of the first and second on-premises connection events is based on the inferred location of the given on premises site, and based on the comparison detecting impossible travel for the entity irrespective of whether the impossible travel is based on i) travel from the given on-premises site to a remote location outside of the multi-site distributed network, ii) travel from the given on-premises site to another on-premises site of the multi-site distribution network, or iii) travel from a remote location outside of the multi-site distributed network to the given on-premises site; and
> providing an alert indicating an impossible travel condition.

10. The method of claim 9, wherein the different connection event comprises a connection event from a different on-premises site associated with the multi-site distributed network.

11. The method of claim 9, wherein the different connection event comprises a connection event from a remote location outside of the multi-site distributed network to the given on-premises site.

12. The method of claim 11, wherein the connection event from the remote location comprises a VPN connection.

13. The method of claim 11, wherein the connection event from the remote location comprises a connection event using at least one of tunneling protocols, cloud services, or consumer connections.

14. The method of claim 9, further comprising:
> pre-processing the information related to the given on-premises connection event to create a standardized information set;
> pre-processing the information related to the different connection event to create a different standardized information set; and
> combining the standardized information sets to create a composite information set, and wherein using the information related to the given on-premises connection event and information related to the different connection event comprises using the composite information set to identify impossible travel.

15. The method of claim 9, further comprising performing post-processing on any detected impossible travel to reduce noise for false positive alerts.

16. The method of claim 15, wherein the post processing comprises pattern recognition for removing common patterns.

17. A computer system for determining impossible travel for users connecting to on-premises sites of a multi-site distributed network, the system comprising one or more processors executing instructions that configure the computer system with an architecture comprising:
> a gateway that accepts communications from both remote and local devices connecting to a given on-premises site associated with the multi-site distributed network, wherein the multi-site distributed network comprises a plurality of on-premises networks that share networking resources including a corpus of IP addresses each of which can be assigned to a user device connected to the distributed network without regard to which on-premises network the user device is connected;
> a monitor coupled to the gateway, wherein the monitor performs at least the following:
> > identifies an estimated location of the given on-premises site by inferring the geolocation of the given on-premises site by aggregating geolocation based on network address information of remote devices that are each logging into the given on-premises site using an external IP address, and wherein local devices that use an internal IP address from the given on-premises site but which are otherwise not locatable via geolocation are then assigned a geolocation equal to the given on-premises site's estimated geolocation;
> > identify information related to a first on-premises connection event at the given on-premises site, wherein the identified information comprises the estimated location, time information, and a first user identification for an entity;

identify information related to a second different connection event, where the information related to the second different connection event comprises location information, time information and a second user identification for the entity; and compare the information related to the first on-premises connection event and the information related to the second different on-premises connection event, wherein the information related to at least one of the first and second on-premises connection events is based on the inferred location of the given on premises site, and based on the comparison detecting impossible travel for the entity irrespective of whether the impossible travel is based on i) travel from the given on-premises site to a remote location outside of the multi-site distributed network, ii) travel from the given on-premises site to another on-premises site of the multi-site distribution network, or iii) travel from a remote location outside of the multi-site distributed network to the given on-premises site; and provide an alert indicating an impossible travel condition.

18. The computer system of claim 17, wherein the first on-premises connection event comprises a connection event at the given on-premises site, and the second different on-premises connection event comprises a connection event from a different on-premises site other than the given on-premises site.

19. The computer system of claim 17, wherein the first on-premises connection event comprises a connection event at the given on-premises site, and the second different connection event comprises a connection event from a remote location to the given on-premises site.

20. The computer system of claim 19, wherein the connection event from the remote location comprises a connection event using at least one of tunneling protocols, cloud services, or consumer connections.

* * * * *